(12) United States Patent
Eisenbeiss et al.

(10) Patent No.: US 11,422,066 B2
(45) Date of Patent: Aug. 23, 2022

(54) TIRE TESTING MACHINE, METHOD FOR TESTING A TIRE AND COMPUTER PROGRAM

(71) Applicants: ZF Friedrichshafen AG, Friedrichshafen (DE); BRIDGESTONE CORPORATION, Tokyo (JP)

(72) Inventors: Jens Eisenbeiss, Fuerstenzell (DE); Roland Bösl, Neuburg am Inn (DE); Markus Kramer, Passau (DE); Lorenzo Alleva, Rome (IT)

(73) Assignees: ZF Friedrichshafen AG, Friedrichshafen (DE); Bridgestone Corporation, Tokyo (JP)

( * ) Notice: Subject to any disclaimer, the term of this patent is extended or adjusted under 35 U.S.C. 154(b) by 253 days.

(21) Appl. No.: 16/485,616

(22) PCT Filed: Feb. 13, 2017

(86) PCT No.: PCT/EP2017/053140
§ 371 (c)(1),
(2) Date: Aug. 13, 2019

(87) PCT Pub. No.: WO2018/145771
PCT Pub. Date: Aug. 16, 2018

(65) Prior Publication Data
US 2020/0049593 A1 Feb. 13, 2020

(51) Int. Cl.
*G01M 17/02* (2006.01)
(52) U.S. Cl.
CPC ........ *G01M 17/022* (2013.01); *G01M 17/021* (2013.01)
(58) Field of Classification Search
CPC .................. G01M 17/022; G01M 17/021
See application file for complete search history.

(56) References Cited

U.S. PATENT DOCUMENTS

2009/0301183 A1* 12/2009 Jenniges ............. G01M 17/022
73/146
2010/0107751 A1 5/2010 Mizone et al.
2011/0138899 A1* 6/2011 Inoue .................. G01M 17/022
73/146

FOREIGN PATENT DOCUMENTS

DE 103 18 058 A1 11/2003
EP 2793013 A1 * 10/2014 .......... G01M 17/022

OTHER PUBLICATIONS

Giadoumis, Driving and Engine Cycles, 2017, p. 201 (Year: 2017).*
(Continued)

*Primary Examiner* — Eric S. McCall
*Assistant Examiner* — Timothy P Graves
(74) *Attorney, Agent, or Firm* — Finch & Maloney PLLC; Jay S. Franklin; Michael J. Bujold

(57) ABSTRACT

Testing the rolling resistance of a tire is a common procedure in tire testing. There is a tire testing machine 1 suggested, comprising a rolling device 4, a tire mounting device 3 and a driving assembly 2, whereby the driving assembly 2 is operable to rotate the rolling device 4 and/or the tire mounting device 3 according to a configurable driving cycle, whereby the rolling device 4 has a drum 5 with an outer peripheral surface 7, whereby the tire 14 is rotatable mountable on the tire mounting device 3, whereby the tire mounting device 3 is arranged that the tire 14 is engaged with the outer peripheral surface 7 of the drum 5, with a first torque measuring assembly 12, a second torque measuring assembly 18, and an angular velocity measuring assembly 12, whereby the first torque measuring assembly 12 is operable to measure a drum drive torque of the drum 5 and the second torque measuring assembly 18 is operable to measure a tire drive torque of the tire (14), whereby the angular velocity measuring assembly 12 is operable to measure and/or cal-
(Continued)

culate the angular velocity of the tire $\omega_T$ and the angular velocity of the drum $\omega_D$.

15 Claims, 4 Drawing Sheets

(56) References Cited

OTHER PUBLICATIONS

International Search Report Corresponding to PCT/EP2017/053140 dated Oct. 20, 2017.
Written Opinion Corresponding to PCT/EP2017/053140 dated Oct. 20, 2017.

\* cited by examiner

TIRE TESTING MACHINE, METHOD FOR TESTING A TIRE AND COMPUTER PROGRAM

The present invention relates to a tire testing machine, comprising a rolling device, a tire mounting device and a driving assembly, whereby the driving assembly is operable to rotate the rolling device and/or the tire mounting device according to a configurable driving cycle, whereby the rolling device has a drum with an outer peripheral surface, whereby the tire is rotatably mountable on the tire mounting device, whereby the tire mounting device is arranged such that the tire is engaged with the outer peripheral surface of the drum, with a first torque measuring assembly, a second torque measuring assembly, and an angular velocity measuring assembly, whereby the first torque measuring assembly is operable to measure a drum drive torque of the drum and the second torque measuring assembly is operable to measure a tire drive torque of the tire and whereby the angular velocity measuring assembly is operable to measure and/or determine the angular velocity of the tire and the angular velocity of the drum. Furthermore, the invention relates to a method for testing a tire and computer program.

The energy consumption and fuel consumption of a car and/or any other vehicle are influenced by the tires. Therefore, the determination of them is often based on testing a tire, whereby the tire is tested by performing a standardized test in a rolling resistance testing machine.

In US 2010/0107751 A1, a tire driving transmission efficiency measuring device, a tire driving transmission efficiency measuring method and a predictive fuel cost calculation method is disclosed. Therefore, a slipping ratio for variating tire loads is calculated based on the tangential force.

The publication DE 10318058 A1, which is probably the closest state of the art, discloses a tire test machine for testing motor vehicle tires, especially under slipping conditions, whereby the wheel is pressed against a rotating drum in the surface of which is an array of a CCD or CMOS total reflection sensors.

The primary object of the present invention is to provide a tire testing machine for a more accurate and meaningful measurement and testing of tires. This object is solved by the tire testing machine, the method for testing a tire, and a computer program according to the independent claim(s). Preferred and more advantageous embodiments of the invention result in the sub-claims, the following description and/or the attached figures.

According to the invention a tire testing machine is provided. Preferably, the tire testing machine is operable to test tires, especially pneumatic tires, e.g., pneumatic tires made of synthetic or natural rubber. In particular, the tire testing machine may be used to test wheels and/or tires from a car, a motorbike, a bicycle and/or heavy equipment. Especially, the tire is part of a wheel, e.g., the outer surface of the wheel.

The tire testing machine comprises a rolling device, a tire mounting device and a driving assembly. Preferably the driving assembly comprises at least one motor, and in particular the driving assembly comprises two motors. The driving assembly is especially in a mechanically operative connection with the tire mounting device and/or the rolling device. The driving assembly may also be part of the rolling device and/or part of the tire mounting device.

The driving assembly is operable to rotate and/or to drive the rolling device and/or the tire mounting device, especially to drive and/or rotate them according to a configurable driving cycle. The configurable driving cycle comprises preferably a time dependent velocity profile, e.g., to change a drive speed of the driving assembly stepwise in time. In particular, the driving cycle comprises a stepwise coast-down or a stepwise drive-up of the drive speed in time, whereby the stepwise coast-down and/or the stepwise drive-up may be linear or polynomial. Preferably, the driving assembly with one motor is used to rotate the rolling device, e.g., to test the tire as a non-driven tire, whereby the driving assembly with two motors rotates and/or drives the tire and the rolling devices, e.g., for testing the tire as a driven tire, for example with acceleration and braking forces at the tire.

The rolling device has a drum, whereby the drum has an outer peripheral surface. Especially the drum is a cylindrical drum, whereby the outer peripheral surface is the cylinder jacket and/or the cylinder lateral area. The drum may be a hollow cylinder or a full cylinder. Particularly, the drum has a moment of inertia and/or no unbalance. In a possible embodiment the drum is a belt, especially a conveyer belt, whereby the outer side of the belt may be considered as the outer peripheral surface.

The tire is rotatable mountable on the tire mounting device. Preferably, the tire mounting device is a tire suspension and/or a shaft for holding the tire. In particular, the driving assembly is operable to rotate the tire on the mounting device, and especially on the shaft. Alternatively, the driving assembly is operable to rotate the tire together with the tire mounting device. The tire mounting device is arranged in a way that the tire is engaged with the outer peripheral surface of the drum. Preferably, the tire mounting device is arranged such that the tire is in planar contact, frictional contact and/or operational contact with the outer peripheral surface of the drum. In particular, the tire has a tire surface, whereby the tire surface is the shell surface of the tire, whereby the tire surface is engaged with the outer peripheral surface of the drum. Especially, the mounting device is arranged such that a rotating tire on the tire mounting device leads to rotation of the drum and/or rotation of the drum leads to rotation of the tire mounted on the tire mounting device.

The tire testing machine comprises a first torque measuring assembly, a second torque measuring assembly and an angular velocity measuring assembly. Preferably the first torque measuring assembly, the second torque measuring assembly and the angular velocity measuring assembly are mechanical, electromagnetic or electromechanical sensors. The angular velocity measuring assembly may comprise one angular velocity sensor or more than one angular velocity sensors. The angular velocity measuring assembly may comprise a RPM-counter, a tachometer and/or an infrared-REV-counter to measure a rotational speed and/or angular velocity. The first torque measuring assembly and/or the second torque measuring assembly is preferably a magnetically elastic torque sensor or a strain gauge. The first torque measuring assembly may be part of the driving assembly and/or of the rolling device. In particular, for a rolling device that is coupled with the driving assembly by a power train, the first torque measuring assembly may be part of the power train. The second torque measuring assembly may be part of the tire mounting device, especially part of the tire suspension and/or the shaft for holding the tire. Preferably, for a tire mounting device, which is coupled with the driving assembly by a power train, the second torque measuring assembly is part of the power train that couples the driving assembly with the tire mounting device.

The first torque measuring assembly is operable to measure a torque of the drum, especially drive torque of the drum, whereby the drum drive torque is the drive torque of the drum. The second torque measuring assembly is operable to measure a tire drive torque of the tire, whereby the tire drive torque is the drive torque of the tire. Preferably the first torque measuring assembly and/or the second torque measuring assembly each comprise a torque sensor, especially to measure the drum drive torque and/or the tire drive torque directly. Alternatively and/or supplementary, the first torque measuring assembly and/or the second torque measuring assembly comprise a force detector to detect a tangential force on the drum, the tire and/or the power train, whereby the first torque measuring assembly and/or the second torque measuring assembly comprise a converting unit, whereby the converting unit calculates the tire drive torque and/or the drum drive torque based on the detected and/or measured tangential forces.

The angular velocity measuring assembly is operable to measure and/or to determine the angular velocity of the tire and of the drum. The angular velocity measuring assembly may comprise two velocity measuring sensors, whereby a first velocity measuring sensor is measuring the angular velocity of the tire and whereby a second velocity measuring sensor is measuring the angular velocity of the drum. Alternatively, the angular velocity measuring assembly is operable to measure the angular velocity of the tire or the angular velocity of the drum, whereby the remaining and/or not measured angular velocity of the drum and/or of the tire is calculated based on the diameter of the tire, the diameter of the drum and the measured angular velocity of the drum.

The tire testing machine comprises a calculation unit. Preferably, the calculation unit is adapted as a software application and/or as a hardware application. Particularly the calculation unit is developed as a computer unit and/or a processor unit. Especially, the calculation unit is connected with the driving assembly such that the calculation unit and the driving assembly are able to exchange data, e.g., the driving cycle and measurement and/or calculation data. The calculation unit is preferably linked with the angular velocity measuring assembly, the first torque measuring assembly and the second torque measuring assembly, whereby the calculation unit is provided with the angular velocity of the drum, the angular velocity of the tire, the tire drive torque and the drum drive torque via this link.

The calculation unit is operable to calculate a current power loss of the tire based on the drum drive torque, the tire drive torque, the angular velocity of the tire and the angular velocity of the drum. Preferably, the current power loss is understood as a loss of power due to a conversion of mechanical energy, drive torque and a braking torque into a mechanical deformation of the tire and a heat generation.

The technical advantage of this invention is that a current power loss of a tire can be measured during a time dependent drive cycle, such that a conclusion can be made from an operating point of a tire to the energy loss due to the tire and to the fuel consumption of a car by using the wheels at different operating points.

In a preferred embodiment of the invention, the calculating unit of the tire testing machine is operable to calculate a current rolling power PR based on the drum drive torque and the angular velocity of the rolling device. The current rolling power PR may be a weighted rolling power PR. Preferably, the current rolling power PR is calculated by the product, especially the cross product, of the angular velocity of the drum and the drum drive torque. Alternatively, the current rolling power PR may be calculated based on the tangential forces, the diameter of the drum and the angular velocity of the drum. In particular, the calculation unit is operable to calculate a current tire power PT based on the tire drive torque and the angular velocity of the tire. Preferably, the current tire power PT is calculated as the product, especially cross product, of the angular velocity of the tire and the tire drive torque. Further, the calculation unit is operable to calculate the current power loss PL of the tire based on the rolling power PR and the tire Power PT. The current power loss PL is preferably calculated as the difference between the current rolling power PR and the current tire power PT, whereby the difference may comprise linear factors, e.g., in such a way that the subtrahends may include waiting factors.

Preferably, the driving cycle takes a time of measurement T, whereby the time of measurement T is also called measurement time T. The time of measurement T is especially longer than thirty seconds and especial longer than two minutes. The time of measurement T is separable in time intervals DTi. The time intervals DTi may be constant and especially may be equidistant. Alternatively, the length of intervals DTi may be variable in time, for example the DTi's may be smaller if parameters in the driving cycle are changing fast and the DTi's may be larger if the parameters in the driving cycle doesn't change very much. The time intervals DTi are preferably smaller than one minute, especially smaller than one second and in particular smaller than one millisecond. The sum over all DTi's is preferably equivalent to the time of measurement T. Alternatively, the time intervals DTi may be overlapping, whereby especially the arrangement of the overlapping DTi's with their overlaps are forming together also the time of measurement T. The calculation unit is preferably operable to calculate the current power loss for each DTi, also referred as PLi. Preferably, the calculation of the current power loss for each DTi results in a time dependent current power loss PL(t), and in particular for a time dependent velocity profile of this results in a velocity dependent power loss PL(v) and/or PL(ω). The measurement time T is especially the time for running a test of one tire and/or is the time for testing the tire once with the velocity profile.

In particular, the calculation unit is operable to calculate an energy loss EL of the tire based on the current power loss PL, the measurement time T and/or the time intervals DTi. Especially, the calculation unit is able to calculate the energy loss EL by multiplying the current power loss PLi with the length time interval DTi. Alternatively, the calculation unit is able to calculate the energy loss EL by integrating the current power loss PL(t) from a lower limit in time to an upper limit, whereby the lower limit is the starting time and the upper limit is the end time. In particular, the energy loss EL is calculated as an energy loss within a time t1→t2 period and/or time interval DTi. Alternatively, the energy loss is calculated for the complete drive cycle and/or for a complete velocity profile, whereby the current power loss PL(t) is integrated in drive DTi for the complete measurement time T. Preferably, the energy loss EL is calculated as $EL=\int_0^T PL(t)\ dT_i$ and/or $EL=\Sigma_i PL_i^* dT_i$, whereby DTi=dTi. The energy loss EL in an arbitrary time interval from $t_1$ to $t_2$ may be calculated as $EL=\int_{t_1}^{t_2} PL(t)\ dT_i$.

In a preferred embodiment of the invention, the calculation unit is operable to calculate a fuel consumption of a vehicle based on an efficiency of a motor of the vehicle, a gearing of the vehicle and/or the power train of the vehicle. Especially the calculation unit is operable to calculate a portion and/or percentage of fuel consumption of the vehicle that is based on the tire, preferably to calculate for different parameters, like vertical tire force and/or tire pressure, the portion and/or percentage of fuel consumption of the vehicle that is based on the tire. For electric cars, the fuel consumption is the energy consumption, especially the electric energy consumption. Therefore, the calculation unit may be operable to calculate the portion and/or percentage of energy consumption of the vehicle that is based on the tire. Particularly, the calculation unit is calculating the fuel consumption based on the current power loss PL and/or the current energy loss EL. Especially, the fuel consumption is dependent on the velocity V of the drive and/or the angular velocity ω of the rolling device and/or the angular velocity of the tire. Since the velocity v depends on time and is v(t), the fuel consumption is dependent on time, such that the fuel consumption is calculated for every time interval DTi.

Preferably, the outer peripheral surface of the drum provides a simulation road surface. The simulation road surface forms for the rotating drum an endless simulation road. Particularly, the simulation road surface is a rough surface and/or a granny surface. For example, the simulation road surface comprises an asphalt surface. In a possible embodiment of the invention, the simulation road surface may be changed during a drive cycle, between two drive cycles and/or a measurement of a tire.

Preferably, the tire is pressed on the drum with a vertical tire force, whereby the vertical tire force may change during the driving cycle. The vertical tire force can also be regarded as for may be the load, whereby the vertical tire force especially perpendicular to the drum shell surface and especially perpendicular to surface in the point of contact between the drum and the tire. In particular, the rolling device and/or the mounting device comprises a dynamometer, whereby the dynamometer measures the vertical force of the tire onto the drum. Preferably, the vertical tire force is constant. Alternative the vertical tire force is changing during the drive cycle or between two drive cycles. Especially, the vertical tire force is changing in a stepwise way, whereby the vertical tire force is in time, for example, constant for a first measuring with the velocity profile and then is changing to a next and/or other vertical tire force and measured again with the velocity profile. With this embodiment of the invention, the energy loss of a vehicle based on the tires can be simulated for different loads, slip angle, chamber angle and/or for turning manoeuvres, whereby the driving on curves is simulated.

In a preferred embodiment of the invention, the driving cycle comprises a first test run with a skim load as a vertical tire force and a second test run with a variating and/or different vertical tire force, a test run is preferably once the drive cycle and/or velocity profile. The skim load is a minimal vertical tire force. Alternatively, the skim load is simulated as a test run of the drum without a vertical tire force and/or without a contact of the tire and the drum. The first test run is preferably used for calculating a current skim rolling power PRS. The second test run is preferably used for calculating a current load rolling power PRL. The current skim rolling power PRS, PRSi, PRS(t) and/or PRS(v) and the current load rolling power PRL, PRLi, PRL(t) and/or PRL(v) is especially calculated for every time interval DTi. Especially, the current rolling power PR is calculated based on the current skim rolling power PRS and the current load rolling power PRL. For example, the current rolling power PR is calculated as a difference between the current skim rolling power PRS and the current load rolling power PRL, whereby the difference is may be calculated as a weighted difference with linear factors. The advantage of this embodiment is that the energy loss according to bearing friction and/or air friction is considered, whereby the measured energy loss and power loss is corrected by these influences, such that the measured energy loss and/or the power loss is more correct.

In a possible embodiment of the invention during the driving cycle the angular velocity of the drum and/or the tire may be changed. Furthermore, it is possible, that the drum drive torque and/or the tire drive torque is changed during the driving cycle and/or is changed according to the drive cycle. Further parameters may be changed during and/or according to the driving cycle, for example these parameters comprise the braking and/or acceleration torque, a lateral force, e.g., due to a slip angle, a chamber angle, a tire pressure, a tire temperature and/or a drum temperature. These parameters may be changed according to a given and/or a changeable drive cycle. In particular the drive cycle is generated and/or based on a real measured drive cycle, whereby the real measured drive cycle was measured and/or recorded on a road and/or on a test bench. Alternatively and/or supplementary, the drive cycle is generated and/or based on a defined drive cycle, whereby the defined drive cycle is a user-defined drive cycle and/or a standardized drive cycle, e.g., the WLTP cycle. Preferably, the lateral force is measured and used to control and/or regulate the slip angle. Furthermore, it is possible that the air pressure in the tire is measured, especially continuously measured, whereby the air pressure in the tire may be regulated, especially continuously regulated. The changes in the parameters may be time dependent and/or may be changed stepwise between test runs and/or drive cycles.

It is preferred, that the tire measuring machine is a rolling resisting testing machine and/or comprises a rolling resisting testing machine.

Another subject matter of the invention is a method for testing a tire. The method for testing the tire comprises a plurality of steps, whereby in a first step, the tire and/or the rolling device is rotated and/or driven by a driving assembly according to a configurable driving cycle. Preferably, the rolling device is rotated and driven by the driving assembly with an adjustable tire angular velocity and the tire is driven and/or rotated by the driving assembly and/or the rolling device with a tire angular velocity. In a further step, the tire is engaged with an outer peripheral surface of the rolling device. Especially, the tire is in surface contact with the outer peripheral surface of the rolling device. A drum drive torque of the rolling device and a tire drive torque of the tire is measured. The drum drive torque and/or the tire drive torque is measured with a torque meter and/or torque sensor. The angular velocity of the tire and the angular velocity of the rolling device is measured and/or determined. Preferably, the angular velocity of the tire or of the rolling device is measured, whereby the remaining not measured angular velocity of the rolling device or of the tire is calculated based on the measured angular velocity and the diameters of the drum and the tire. The current power loss of the tire is calculated based on the drum drive torque, the tire drive torque, the angular velocity of the tire and the angular velocity of the drum.

Preferably the method for testing a tire is using a tire testing machine according to the previous description.

A further subject of the invention is a computer program for using, performing and/or controlling the method for testing a tire with a tire testing machine. The computer program may be used on a computer and/or a processor unit and especially may be used on the tire testing machine. The computer program comprises program means and/or software means that are performing the method for testing a tire.

DESCRIPTION OF THE DRAWINGS

FIG. 1 shows a plane view of a tire test machine 1. The tire test 1 machine comprises a driving assembly 2, a tire mounting device 3 and a rolling device 4. The rolling device 4 comprises a drum 5, whereby the drum 5 is rotatable around a drum axis 6. The drum is a cylindrical drum 5 with an outer peripheral surface 7, whereby the outer peripheral surface 7 is formed by the shell surface of the drum 5. The drum 5 is rotatable around the drum axis 6, whereby the drum 5 is rotating with an angular velocity $\omega_D$. The drum 5 has a circular cross section, whereby the circular cross section has a diameter $D_D$. The drum axis 6 is coupled and/or formed with a drive train 8, whereby the drive train 8 is also coupled with the driving assembly 2. The driving assembly 2 comprises a first motor 9, whereby the first motor 9 is coupled with the drive train 8 in order to drive and/or rotate the drum 5 with the angular velocity $\omega_D$. The drive train 8 also comprises a first torque measuring assembly 10 and a first RPM meter 11. The first torque measuring assembly 10 is able to measure a torque, especially the drive torque of the drum, which is similar and/or forming the drive torque of the drum MD. The first RPM meter 11, which comprises a velocity measuring assembly 12, is able to measure the angular velocity $\omega_D$ of the drum.

Figure 1:
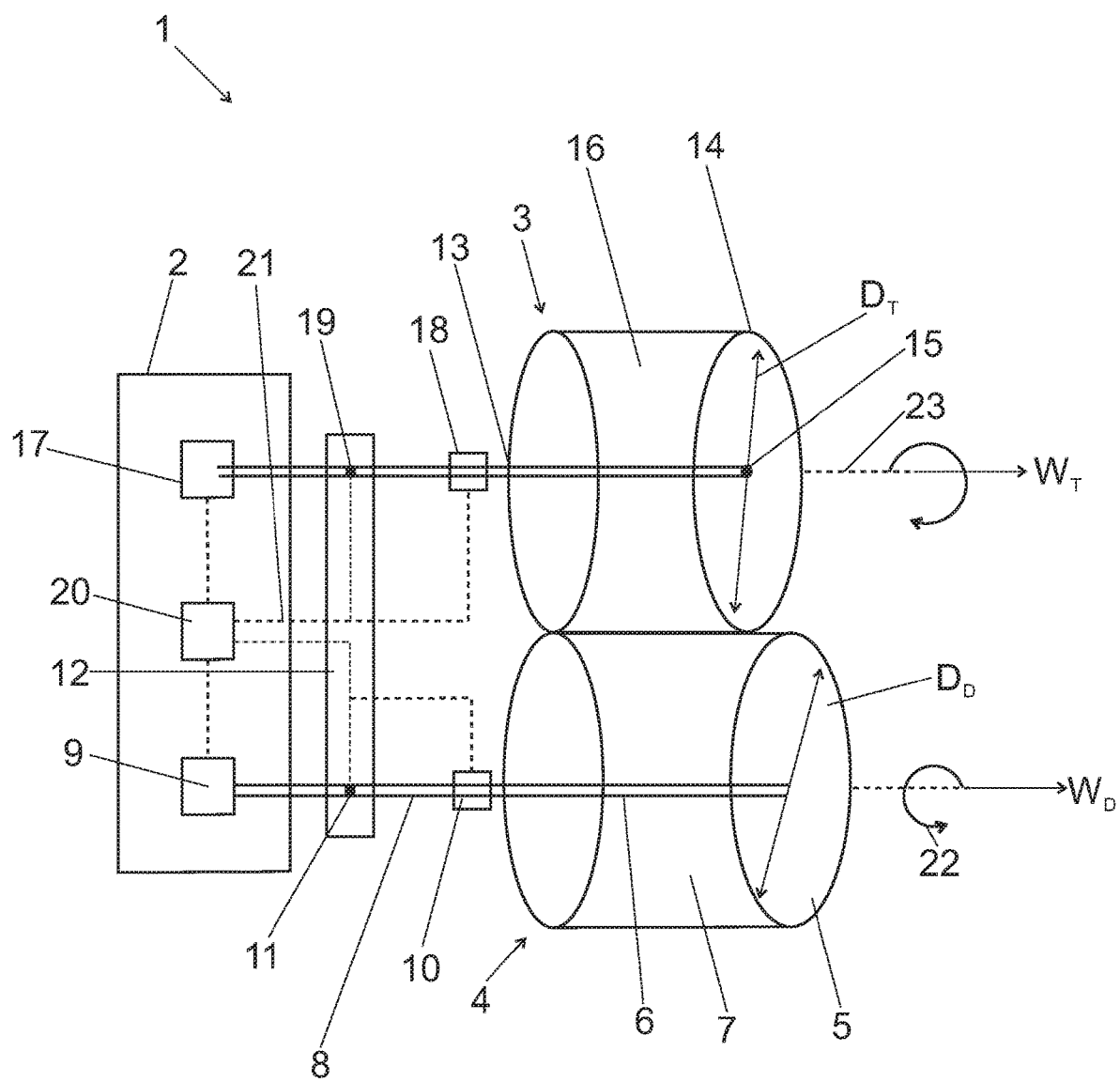
FIG. 1 plane view of a tire test machine.

The tire mounting device 3 comprises a rotation shaft 13, which is made as a spindle. A tire 14, which has to be tested, is attached to the rotational shaft 13. The tire 14 is rotatable around a tire axis 15, whereby the tire axis 15 may be formed by the rotation shaft 13 and/or is coincident with it. The tire 14 is able to rotate around the tire axis 15, whereby the tire 14 rotating around the tire axis has angular velocity of the tire $\omega_T$. The tire mounting device 3 and therefore also the tire 14 are arranged in a way such that the tire 14 is in extensive contact with the outer peripheral surface 7. The tire 14 comprises a tire shell surface 16, whereby tire shell surface 16 is the shell surface of the cylindrical tire 14. The tire 14 has a circular cross section, whereby the circular cross section of the tire has a diameter $D_T$. In particular, the tire shell surface 16 is in extensive and/or flat contact with the outer peripheral surface 7 of the drum 5. The tire 14 is pressed against the drum 5 with a vertical tire force $F_T$, such that the drum 5 and the tire 14 are in frictional contact and/or in force contact. The rotating drum of the tire 14 is understood as the energy that is formed and/or transformed into thermal energy and/or deformance of the wheel per second and is therefore no longer usable for the desired mechanical result.

Figure 2:
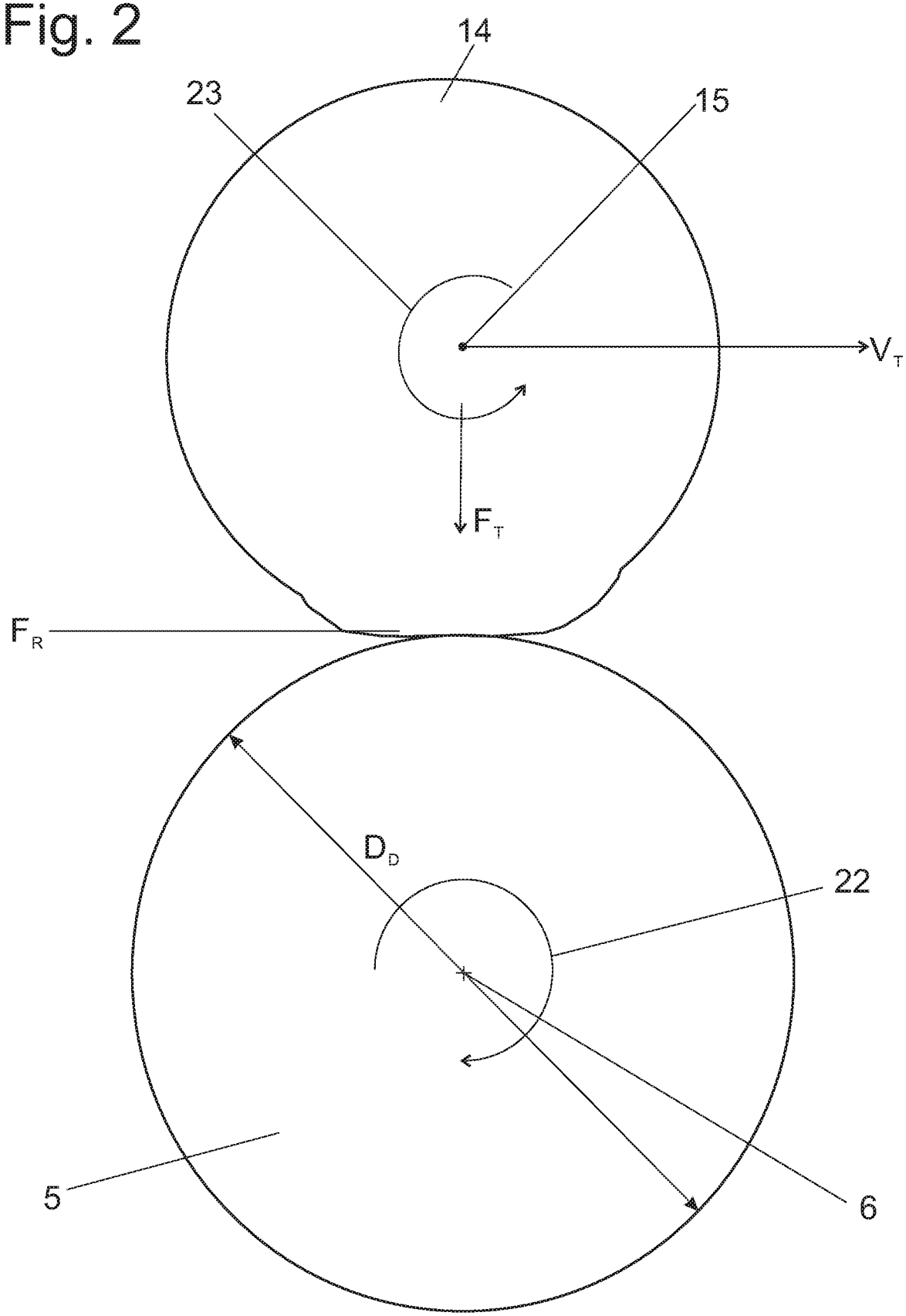
FIG. 2 plane view on the tire testing machine in the direction of the drum axis.

FIG. 2 is a plane view on the tire testing machine 1 in the direction of the drum axis 6 and the tire axis 15. The drum 5 has a circular cross section with a diameter $D_D$. The drum 5 is rotating around drum axis 6 with an angular velocity wo, whereby the rotation of the drum 5 is in the drum rotation direction 22.

The tire 14 has an almost circular cross section, whereby the circular section of the tire 14 is flattened and deformed in the area where the tire 14 is in contact with the drum 5. The tire 14 is pressed against the drum 5 with a vertical tire force $F_T$, whereby the vertical tire force $F_T$ has a value which is the range and/or magnitude of a typical vertical tire force of a car or motorcycle. For changing the vertical tire force $F_T$ and/or for using tires with different diameter $D_T$ the tire testing machine 1 comprises means for changing the distance between the tire axis 15 and the drum axis 6. The tire 14 and the drum 5 are in frictional contact, such that the rotation of the drum 5 is transferred to the tire 14 and the tire 14 is also turned and rotates. The tire 14 is rotating with a tire angular velocity $\omega_T$, where by the rotational direction of the tire 14, the so-called tire rotational direction 23, is in the opposite direction of the drum rotation direction 23. The multiplication of the angular velocity of the tire $\omega_T$ with the radius of the tire 14, with is the half of the diameter $D_T$, leads to a tire velocity $v_T$, which with correspond to a vehicle velocity when the tire 14 is used in a vehicle when the tire 14 is rotating with the same angular velocity of the tire 14 $\omega_T$. The rolling resistance FA is a force resisting the motion when the tire 14 rolls on a surface. The rolling resistance FA is therefore in the opposite direction of the tire velocity $v_T$. The point of force application of the rolling resistance force FA is preferably the contact point and/or in the contact area of the tire 14 with the drum 5. The flattening and all the deformations of the tire 14 is specially caused by the vertical tire force $F_T$ and the fact that the tire 14 is a pneumatic, elastic body. The deformation of the tire 14 results in a transformation of a mechanical energy in to a deformation energy and especially in to thermal energy, where by the deformation energy and the thermal energy is not used for the actual purpose of the insurant energy.

Figure 3:
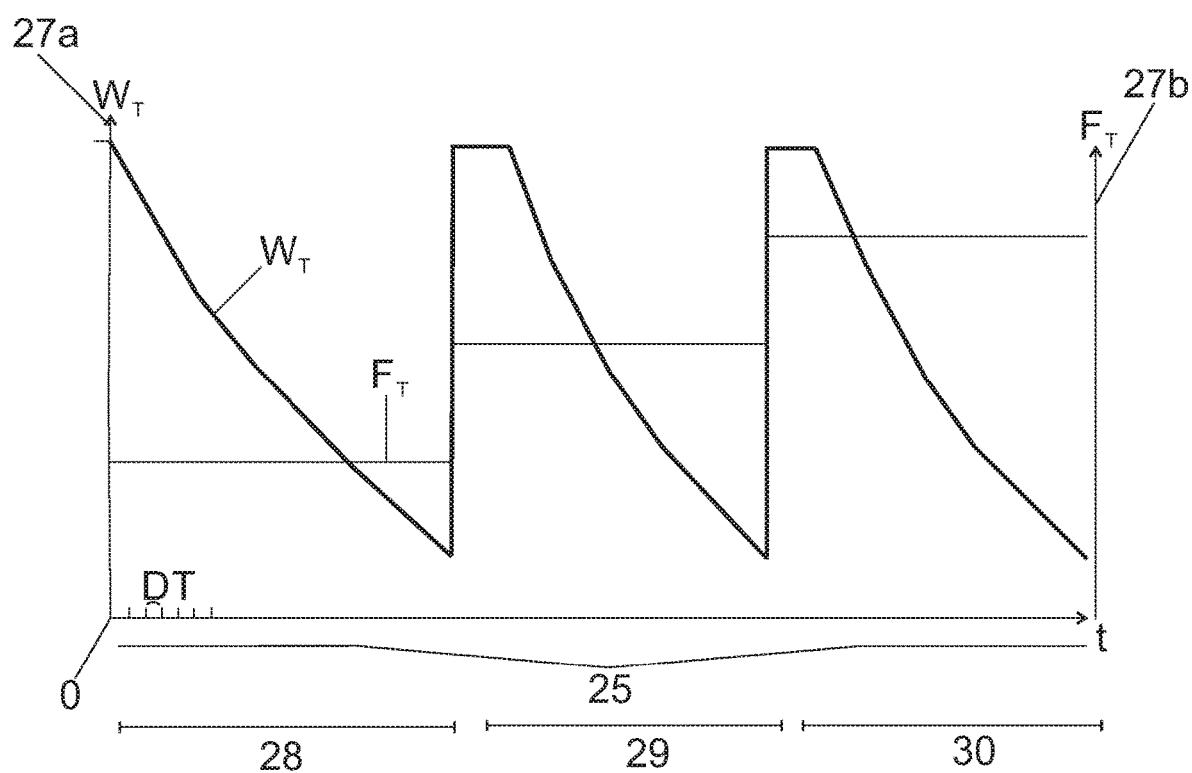
FIG. 3 diagram of tire test,
FIG. 4 diagram of a drive cycle.

FIG. 3 shows a diagram 24 as a tire test 25. The diagram 24 comprises an axis of abscissas 26 and two axis of ordinates 27a and 27b. The axis of abscissas 26 is forming the time axis, the axis of ordinates 27a is forming the angular velocity axis of the tire $\omega_T$ and the axis of ordinates 27b is forming the vertical of force $F_T$. The tire test 25 comprises first test run 28, second test run 29 and a third test run 30, whereby each of the velocity dependence within the test runs 28, 29 and/or 30 may be seen as the drive cycle. Alternatively, the first test run 28, second test run 29 and a third test run 30 are forming the drive cycle. The time of the first test run 28, the second test run 29 and the third test run 30 are equal, such that the first test run 28, the second test run 29 and the third test run 29 are deviating the test time T by three. The test time T is also divided in equidistant time intervals $D_T$, where by the time interval $D_T$ are smaller than one second and larger than one millisecond. Within one test run, especially the first test run 28, the second test run 29 and the third test run 30, the angular velocity of the Tire $\omega_T$ is decreasing in time, where by decreasing of the angular velocity of the tire $\omega_T$ is described by a power law. The maximum of angular velocity of the tire $\omega_T$ is chosen such that the tire velocity $v_T$ is larger than one hundred kilometres per hour and smaller than one hundred thirty kilometres per hour. The minimum angular velocity of the tire during a test run is chosen that the tire velocity $v_T$ is smaller than thirty kilometres per hour larger than five kilometres per hour. After the first test run 28 and after the second test run 29 the rotation velocity of the tire $\omega_T$ is rapidly increasing to the starting angular velocity of the tire and of the first test run 28. The starting velocity is held constant for a time, e.g., for ten seconds, to equilibrate the tire 14 in order to get comparable restarts. The time dependence of the angular velocity of the tire $\omega_T$ is for the second test run 29 and the third test run 30 equivalent to the time dependence of the angular velocity of the tire $\omega_T$ of the first test run 28.

The vertical tire force $F_T$ is held constant within a test run, but is changed between the different test runs. The vertical tire force $F_T$ is, for example, minimal and or almost zero in the first test run 28, to get a test run with a skim load and to obtained the carnet skim rolling power PRS. After the first test run 28, the vertical tire force $F_T$ is increased and held constant in the second test run 29. For example, the vertical tire force $F_T$ is in the second test run 28 used to simulate a turning manoeuvre and or a drive with a lot of curves. After the second test run 29, the vertical tire force $F_T$ is increased another time, whereby the vertical tire force $F_T$ in the third test run 30 correspondent to a vertical tire force $F_T$ that is typical for using the tire in the relevant vehicle. The current power loss of the tire 14, the current tire power PL and the current rolling power PR are calculated by the calculation unit for an interval $D_T$. To obtain the energy loss EL of the tire 14 the current power loss PL of the tire is integrated and or summed up for a chosen length in time. To obtain the complete energy loss jurying a test run, the tire power lost is integrated in time over the time period of the first test run 28, in this example from zero to T/3, or from T/3 up to 2T/3 and/or from 2T/3 up to T. It is also possible to change the accelerating torque, the braking torque, the lateral force, the slip angle, the chamber angle, the tire pressure, a tire temperature and/or a drum temperature. Preferably, the tire test machine, especially the tire mounting device 3 comprises a pressure measuring device to measure the air pressure in the tire 14 during the tire test 25 and/or during the driving cycle. Preferably, the pressure measuring device is able to change and/or control the air pressure in the tire 14 during the tire test 25 and/or test run.

Figure 4:
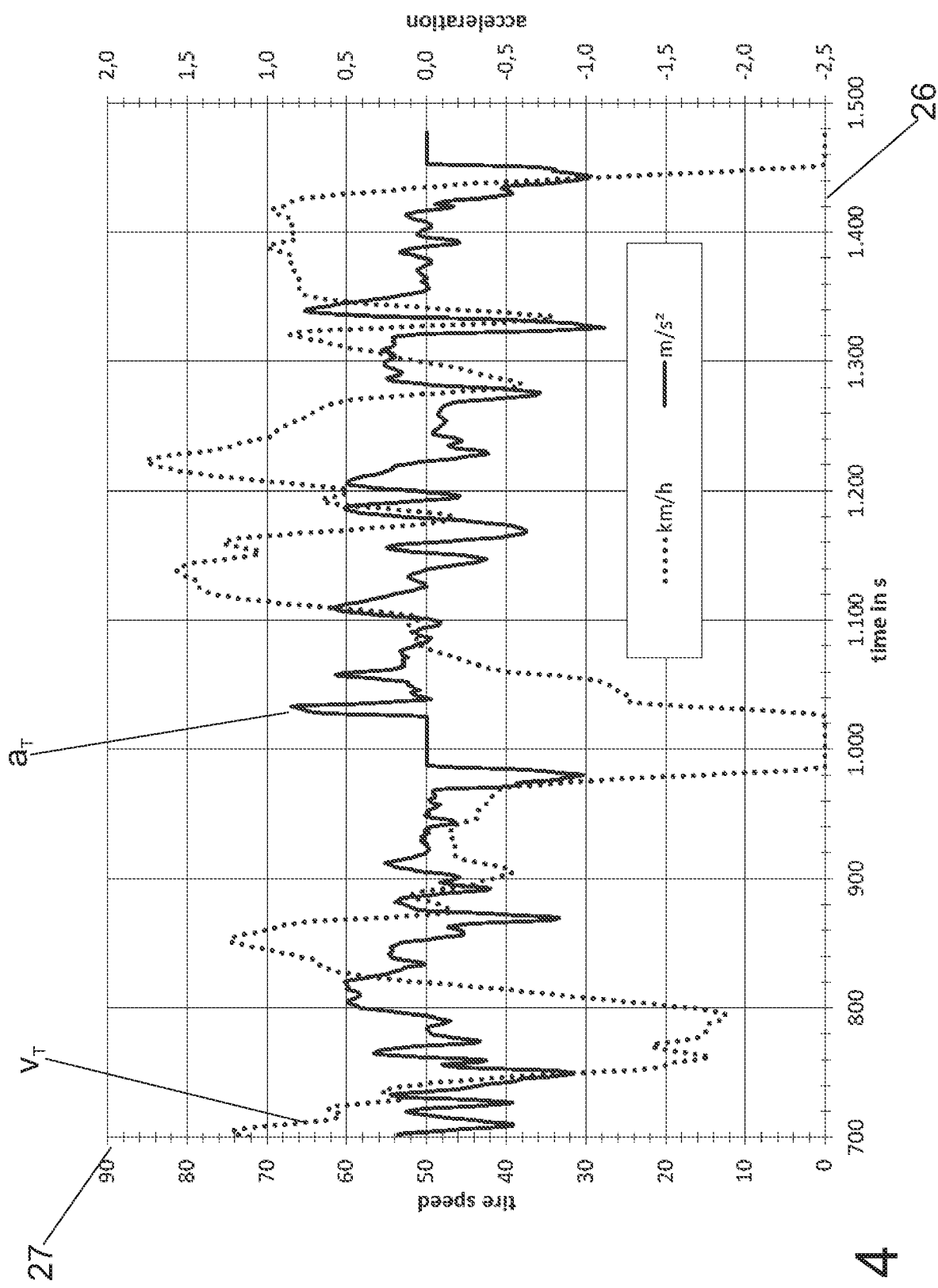

FIG. 4 shows a diagram of a section of a drive cycle, especially the course of the tire velocity $v_T$ and the acceleration $a_T$. The acceleration $a_T$ is basically the time derivative of the tire velocity $v_T$, such that the acceleration $a_T$ may be calculated out of the measured tire velocity $v_T$. On the axis of abscissa the time is recorded, the section of the drive cycle is shown from second 700 to second 1500. In this time interval the tire speed $v_T$ starts at 80 km/h and is varying in time to 0 km/h, up again to 80 km/h and back to 0 km/h. Between the zeros the tire velocity is also fluctuating. The acceleration $a_T$ is oscillating and/or wobbling between 1.0 m/s$^2$ and −1.5 m/s$^2$, this means and/or leads to acceleration and braking of the tire and/or a test drive with a simulation of acceleration and braking of the vehicle.

REFERENCE SIGNS

1 Tire test machine
2 Driving assembly
3 Tire Mounting device
4 Rolling device
5 Drum
6 Drum axis
7 Outer peripheral surface
8 Drive Train
9 Motor 1
10 Torque measuring assembly
11 RPM meter 1
12 Velocity measuring assembly
13 rotation shaft
14 Tire
15 Tire axis
16 Tire shell surface
17 Motor 2
18 Torque measuring assembly 2
19 RPM meter 2
20 Calculation unit
21 link
22 Drum rotation direction
23 Tire rotation direction
24 Diagram
25 Tire test
26 axis of abscissas
27 axis of ordinates
28 Test run 1
29 Test run 2
30 Test run 3
$D_D$ Diameter of drum
$D_T$ Diameter of tire
$\omega_D$ Angular velocity of drum
$W_T$ Angular velocity of tire
$F_T$ Vertical tire force
$F_R$ Rolling resistance
$v_T$ Tire velocity

The invention claimed is:

1. A tire testing machine comprising:
a rolling device,
a tire mounting device, and
a driving assembly,
the driving assembly being operated to rotate the rolling device and/or the tire mounting device according to a configurable driving cycle having a time dependent velocity profile which is divided into a plurality of equal time intervals,
the rolling device having a drum with an outer peripheral surface,
the tire being rotatably mountable on the tire mounting device,
the tire mounting device being arranged relative to the rolling device such that the tire engages with the outer peripheral surface of the drum, and at least one of the tire and the rolling device is adjustable to change at least one of a slip angle and a camber angle of the tire relative to the outer peripheral surface of the drum,
a first torque measuring assembly, a second torque measuring assembly, and an angular velocity measuring assembly,
the first torque measuring assembly being operable to measure a drum drive torque of the drum and the second torque measuring assembly being operable to measure a tire drive torque of the tire,
the angular velocity measuring assembly being operable to measure and/or calculate an angular velocity of the tire and an angular velocity of the drum, and
a calculation unit being operable to calculate a current power loss of the tire based on the drum drive torque, the tire drive torque, the angular velocity of the tire and the angular velocity of the drum,
wherein the configurable driving cycle comprises a first test run which is run over a first one of the plurality of time intervals with a skim load applied as a vertical tire force, a second test run which is run over a second one of the plurality of time intervals with a second vertical tire force which is larger than the skim load of the first test run, and a third test run which is run over a third one of the plurality of time intervals with a third vertical tire force which is larger than the second vertical tire force of the second test run, and the applied vertical tire force, for each one of the first, the second and the third test runs, is held constant.

2. The tire testing machine according to claim 1, wherein the calculation unit is operable to calculate, based on the drum drive torque and the angular velocity of the drum, a current rolling power, the calculation unit is operable to calculate based on the tire drive torque and the angular velocity of the tire a current tire power, and the calculation unit is operable to calculate a current power loss of the tire based on the rolling power and the tire power.

3. The tire testing machine according to claim 1, wherein the driving cycle takes a time (T) of measurement, the time (T) of measurement is separable in the plurality of time intervals ($DT_i$), whereby $T=\Sigma_i DT_i$, and the calculation unit is operable to calculate the current power loss of the tire for each of the plurality of time intervals ($DT_i$).

4. The tire testing machine according to claim 1, wherein the calculation unit is operable to calculate an energy loss of the tire based on the current power loss of the tire, the measurement time (T) and/or the plurality of time intervals ($DT_i$).

5. The tire testing machine according to claim 1, wherein the calculation unit is operable to calculate a fuel consumption of a vehicle and/or the energy consumption of an electric car based on the current power loss of the tire and an efficiency of a motor, gearing and/or powertrain of the vehicle and/or the electric car.

6. The tire testing machine according to claim 1, wherein the calculation unit is operable to calculate a portion of fuel consumption or a portion of energy consumption that is based on the tire.

7. The tire testing machine according to claim 1, wherein the outer peripheral surface of the drum provides a changable simulation road surface.

8. The tire testing machine according to claim 1, wherein the tire is pressed against the drum by the vertical tire force, the vertical tire force is defined as a force by which the tire is pressed against the drum in a direction that is perpendicular to the outer peripheral surface of the drum at a point of contact between the tire and the drum, and the vertical tire force.

9. The tire testing machine according to claim 8, wherein, for the first test run, a current skim rolling power is calculated and, for the second test run, a current load rolling power is calculated, whereby the current rolling power is calculated based on the current skim rolling power and on the current load rolling power, and the vertical tire force is changed in a stepwise manner such that the vertical tire force is different for each of the plurality of equal time intervals.

10. The tire testing machine according to claim 1, wherein at least one of the angular velocity of the drum, the angular velocity of the tire, the drum drive torque, the tire drive torque, a braking torque, a vertical force, a tangential force, a lateral force, a tire pressure, a tire temperature, an air temperature and a drum temperature is changing according to the drive cycle.

11. The tire testing machine according to claim 10, wherein the drive cycle is at least one of generated and based on at least one of a real measured drive cycle and a defined drive cycle,
the angular velocity of the tire decreasing in time; and
between the first test run and the second test run and between the second test run and the third test run, rapidly increasing the rotation velocity of the tire so that the starting angular velocity of the tire is initially the same at a beginning of each of the first, the second and the third test runs.

12. The tire testing machine according to claim 1, wherein the tire testing machine is a rolling resistance testing machine.

13. A method for testing a tire, the method comprising:
rotating and/or driving the tire and/or a rolling device by a driving assembly according to a configurable driving cycle having a time dependent velocity profile which is divided into a plurality of equal time intervals,
engaging the tire with an outer peripheral surface of the rolling device such that the tire applies a tire force on the outer peripheral surface of the rolling device,
measuring a drum drive torque of the rolling device and a tire drive torque of the tire during each of the plurality of test runs,
measuring and/or determining an angular velocity of the tire and of the rolling device during each of the plurality of test runs, and
calculating for each of the plurality of test runs a current power loss of the tire based on the drum drive torque, the tire drive torque, the angular velocity of the tire and the angular velocity of a drum of the corresponding test run;
wherein the plurality of test runs comprises a first test run which is run over a first one of the plurality of time intervals with a skim load applied as a vertical tire force, a second test run which is run over a second one of the plurality of time intervals with a second vertical tire force which is larger than the skim load of the first test run, and a third test run which is run over a third one of the plurality of time intervals with a third vertical tire force which is larger than the second vertical tire force of the second test run, and the applied vertical tire force, for each one of the first, the second and the third test runs, is held constant.

14. The method for testing a tire according to claim 13 with a tire testing machine which comprises:
a rolling device,
a tire mounting device, and
a driving assembly,
the driving assembly is operable to rotate the rolling device and/or the tire mounting device according to the configurable driving cycle,
whereby the rolling device has the drum with an outer peripheral surface,
the tire is rotatably mountable on the tire mounting device,
the tire mounting device is arranged such that the tire engages with the outer peripheral surface of the drum and such that at least one of the tire and the rolling device is adjustable to change at least one of a slip angle and a camber angle of the tire relative to the outer peripheral surface of the drum,
with a first torque measuring assembly, a second torque measuring assembly, and an angular velocity measuring assembly,
the first torque measuring assembly is operable to measure a drum drive torque of the drum and the second torque measuring assembly is operable to measure a tire drive torque of the tire,
whereby the angular velocity measuring assembly is operable to measure and/or calculate the angular velocity of the tire and the angular velocity of the drum, and
a calculation unit is operable to calculate the current power loss of the tire based on the drum drive torque, the tire drive torque, the angular velocity of the tire and the angular velocity of the drum.

15. A computer program with program means executable on a computer and/or the tire testing machine, whereby the computer program is operable to perform the method according to claim 13.

* * * * *